(12) United States Patent
Kotecki

(10) Patent No.: US 6,339,209 B1
(45) Date of Patent: *Jan. 15, 2002

(54) ELECTRODE AND FLUX FOR ARC WELDING STAINLESS STEEL

(75) Inventor: Damian J. Kotecki, Mentor, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/438,803

(22) Filed: Nov. 12, 1999

Related U.S. Application Data

(63) Continuation-in-part of application No. 08/985,953, filed on Dec. 5, 1997, now abandoned.

(51) Int. Cl.$^7$ ................................................ B23K 35/34
(52) U.S. Cl. ........................... 219/146.23; 219/146.22; 219/146.1; 219/145.22; 148/24
(58) Field of Search ........................ 219/146.23, 146.1, 219/145.22, 145.1, 146.41, 146.32; 148/22, 23, 24, 26; 228/224

(56) References Cited

U.S. PATENT DOCUMENTS

| | | | | |
|---|---|---|---|---|
| 3,778,588 A | | 12/1973 | Bishel | |
| 3,848,109 A | | 11/1974 | Zvanut | |
| 4,149,063 A | | 4/1979 | Bishel | |
| 4,314,136 A | * | 2/1982 | Kotecki | 219/146.23 |
| 4,345,140 A | * | 8/1982 | Godai et al. | 219/146.23 |
| 4,449,031 A | | 5/1984 | Kotecki | |
| 4,510,374 A | * | 4/1985 | Kobayashi et al. | 219/146.1 |
| 5,099,103 A | * | 3/1992 | Yamada et al. | 219/145.22 |
| 5,120,931 A | * | 6/1992 | Kotecki et al. | 219/146.22 |
| 5,219,425 A | * | 6/1993 | Nishikawa et al. | 228/56.3 |
| 5,378,871 A | * | 1/1995 | Nishikawa et al. | 219/145.22 |

FOREIGN PATENT DOCUMENTS

| | | |
|---|---|---|
| JP | 55-149796 | 11/1980 |
| JP | 62-40995 | 2/1987 |

* cited by examiner

*Primary Examiner*—M. Alexandra Elve
(74) *Attorney, Agent, or Firm*—Vickers, Daniels & Young

(57) ABSTRACT

A flux for use in arc welding of a stainless steel workpiece with a consumable metal electrode, which welding flux comprises a zirconia containing system for forming a slag on the surface of the deposited weld metal. The flux system contains zirconia, silica and titania. The zirconia and titania are contained the flux system in a ratio of at least 1:1.5. The flux system can also include a melting control agent, a fluoride, an arc stabilizer, a slag removal agent and/or a bead wetting agent. Also, there is provided an electrode employing this flux.

46 Claims, No Drawings

ELECTRODE AND FLUX FOR ARC WELDING STAINLESS STEEL

This patent application is a continuation-in-part of my U.S. Patent application Ser. No. 08/985,953, filed Dec. 5, 1997.

The present invention relates to the art of arc welding and more particularly to an electrode and flux for gas shielded flux cored arc welding of stainless steel.

INCORPORATION BY REFERENCE

Incorporated by reference herein is Godai 4,345,140 relating to a composite electrode containing a flux including a silica and a specific metal oxide with a low melting point of no more 10 than 888° C.; Kotecki 5,120,931 relating to a composite electrode containing a silica containing flux system and a slag releasing agent; Kotecki 4,449,031 relating to a composite electrode containing a zirconium oxide based flux system; and Nishikawa 5,219,425 and Nishikawa 5,378,871 relating to a composite electrode containing a titania flux system and a specific amount of titanium metal and a fluoride.

BACKGROUND OF INVENTION

The invention is applicable to welding of ferrous metals, and particularly to arc welding of stainless steel by a flux cored electrode having at least about 1–30% chromium and it will be described with particular reference thereto; however, the invention has broader applications and may be used for coated electrodes and submerged arc welding of various ferrous metals, high chromium 20 steels, chromium bearing alloys and other types of metal.

When welding a high chromium-bearing alloy such as stainless steel, it is somewhat common practice to weld such metals with a flux cored electrode and to use a shielding gas such as $CO_2$ during the electric arc welding process. The electrode includes an outer steel sheath surrounding an inner core. The inner core includes a flux system in granular form and, in some instances, includes alloying agents and iron powder. The cored electrode may also include chromium in an appropriate amount, generally as powder within the core of the electrode. The alloying agents are selected so that the formed metal alloy has a similar composition to the workpieces being welded. The core material in the electrode core is generally divided into the fluxing system or flux and the alloying constituents. In a high chromium electrode of the type used for flux cored arc welding of stainless steel, the fluxing system or flux often includes titanium dioxide, silica which may be in the form of a silicate, calcium fluoride and various other non-metallic compounds which react in the arc of the arc welding process to create a slag that forms over the outer surface of the weld bead. The slag is formulated to protect the weld bead until it has solidified and is appropriately joined to the workpiece. This slag also helps in forming the shape of the weld metal in the weld bead as well as protecting the molten alloy material in the weld bead until it has appropriately solidified. Stainless steel and other chromium bearing alloys produce substantial problems in slag formation. The chromium of the steel normally produces a chromium oxide which tends to adhere the nonmetallic slag onto the outer surfaces of the weld bead. As a result, the slag adheres rigidly and tenaciously to the molten alloy of the weld bead as it is solidified. Due to the differential in thermal expansion coefficients, often the slag will be placed in compression and actually explode from the weld bead during cooling of the chromium bearing alloy forming the weld bead. When the slag explodes from the weld bead during the solidification process, the surface of the weld bead is exposed to the atmosphere thus resulting in premature oxidation of the weld metal. In addition, special precautions must be taken to protect against the detrimental effect of exploding hot slag created during the welding process. Another difficulty experienced when welding chromium bearing alloy, and is believed to be also associated with the formation of chromium oxide, is that the weld metal tends to adhere to the slag during the solidification weld bead. If the slag remains on the weld bead during cooling, the slag is extremely difficult to remove, thus resulting in substantial cost and time to grind the slag from the weld bead or otherwise removing the slag from the solidified molten chromium bearing alloy of the weld bead. All of these difficulties in welding chromium bearing alloy are well known in the arc welding art Thus, there is and always has been a need for a particular flux system that does not result in premature and/or violent removal of the slag during the cooling process, while also allowing convenient and inexpensive slag removal after the weld bead containing the chromium bearing alloy has solidified and cooled. Thus, there is a substantial desire for a welding system to be used in a high chromium welding electrode or with a high chromium welding wire which will produce a slag that adheres to the molten metal alloy of the weld bead as it is being solidified for surface protection, but which can be easily removed from the weld bead after the weld bead has cooled.

U.S. Pat. Nos. 4,449,031 and 5,120,931 disclose a flux system which addressed many of the problems associated with slag when welding a chromium containing workpiece. Kotecki 4,449,031 discloses a flux mixture that includes large amounts of zirconium oxide and small amounts of silica which is used in association with a stainless steel electrode to produce a high melting slag during welding. Zirconium oxide is disclosed as the key slag ingredient since it forms a high melting slag which supports the molten weld metal during out-of-position welding. Zirconium oxide is included in the slag mixture in an amount of about 15–60 weight percent of the slag mixture. Titanium oxide is included in the slag mixture to add bulk to the slag. The titanium oxide assists in supporting the molten weld metal during out-of-position welding. Silicon dioxide can be, but is not required to be, added to the slag mixture in an amount of up to 10 weight percent to reduce spatter during welding. Fluorides can also be added to the slag mixture to combat weld porosity, raise the electrode's voltage tolerance during welding and to shield the welding weld metal during welding.

Kotecki 5,120,931 discloses a silica containing slag mixture which primary components are silica and titania and a bismuth slag releasing agent. The slag mixture includes large amounts of silica and small amounts of zirconium oxide. Kotecki 5,120,931 discloses a different approach from Kotecki 4,449,031 to overcome the slag popping and slag removal problems associated with welding chromium containing metals. Kotecki 5,120,931 discloses a high silica-titanium oxide containing slag mixture having significantly less zirconium oxide than the slag mixture of Kotecki 4,449,031. Kotecki 5,120,931 discloses a slag mixture that overcomes the spattering problems of the slag by adding large quantities of silica to the slag mixture. When welding stainless steel having a significant chromium content, the addition of silica in the slag reduces spatter during welding. However, the increased amount of silica adversely affects slag behavior during welding and causes the slag to become difficult to be removed from the weld bead. To overcome this slag adhesion problem, Kotecki 5,120,931 discloses a slag mixture that includes a bismuth slag releasing agent. Kotecki 5,120,931 discloses that a silica content of less than 10 weight percent results in spattering to the weld metal which results in a lower quality weld bead. The silica content of the slag mixture is disclosed as being about 10–80 weight percent. The bismuth slag releasing agent is present in an amount of at least 0.5 weight percent of the slag mixture. Titanium oxide is included in the slag mixture to add bulk to the slag. Zirconium oxide is added to the slag mixture in the amount of 5–20 weight percent. The present invention is an improvement over the slag mixture disclosed in Kotecki 5,120,931 and Kotecki 4,449,031.

SUMMARY OF THE INVENTION

The present invention relates to a flux to be used with a high chromium weld bead, such as a weld bead having over 1.0% chromium and preferably for a stainless steel having greater than 15% chromium, wherein the slag will protect the chromium bearing alloy as it is being solidified subsequent to the welding process, but which can be removed easily after cooling of the chromium bearing alloy in the weld metal of the deposited weld bead.

This invention is more particularly applicable for flux cored high chromium electrodes and it will be described with particular reference thereto; however, it can be employed in arc welding electrodes having low containing or no chromium compositions, in arc welding of various types of metal compositions, wherein the flux is coated to the outside surface of the electrode and/or wherein a metal wire is used in a submerged arc welding process. The invention can be used in welding consumables for other chromium bearing alloys, such as hardfacing alloys or other types of metals. In all instances, the flux system is applicable to create a slag over the weld bead which slag protects the weld bead until it is solidified and cooled while allowing convenient and inexpensive removal of the slag after the welding process has been completed.

If the electrode is a flux cored wire that does not contain a significant amount of chromium, i.e. substantially less than 1% chromium, slag behavior and slag removal typically are not serious problems. However, when chromium is added to the electrode for the purpose of depositing a chromium bearing alloy, such as stainless steel onto the workpiece, slag behavior and removal tend to deteriorate for reasons mentioned previously. When the chromium percentage in the deposited alloy exceeds 15–20%, as in stainless steel, the non-metallic constituents of the flux system in the core should be selected to quiet the slag behavior and allow easy removal of the slag. In Kotecki 4,449,031 and Kotecki 5,120,931, the slag behavior problems were addressed in different manners. In Kotecki 4,449,031, the silica in the flux system was minimized and the primary components of the flux system were zirconium oxide, titanium oxide and fluorides. In Kotecki 5,120,931, the opposite was employed wherein the zirconium oxide and fluoride content in the flux system were reduced and the primary components of the flux system were silica and titanium. Kotecki 5,120,931 also included a bismuth releasing compound in the flux to compensate for the slag removal problems associated with increasing the silica content of the flux system.

The present invention is an improvement over Kotecki 4,449,031 and Kotecki 5,120,931. In the present invention, the primary components of the flux system are a silicon compound, a titanium compound and a zirconium compound. The silicon compound, titanium compound and zirconium compound make up a majority of the flux system. In one embodiment, the zirconium compound is a fluoride and/or oxide of zirconium. In one specific embodiment, zirconia constitutes a majority of the zirconium compound in the flux system. The zirconium compound in the flux system reduces popping and spattering during welding without impairing slag removal from the weld bead. The zirconium compound also facilitates in the removal of the slag from the weld bead. The increased amount of zirconium compound further forms a slag which supports the weld metal in out-of-position welding. In another embodiment, the silicon compound is a fluoride and/or oxide of silicon. In one specific embodiment, silica constitutes a majority of the silicon compound in the flux system. The silicon compound in the flux system reduces popping and spattering during welding. The silicon compound, in large amounts, can cause the slag to be difficult to be removed from the weld bead. However, the slag removal short comings of the silicon compound are minimized by incorporating more zirconium compound than silicon compound in the flux system. The zirconium compound has been found to counter the slag removal problems caused by the silicon compound in the flux system. Consequently, the inclusion of an additional slag releasing agent in the flux system is optional. In still another embodiment, the titanium compound is a fluoride and/or oxide of titanium. In one specific embodiment, titania constitutes a majority of the titanium compound in the flux system. The titanium compound in the flux system increases the viscosity and/or density of the slag thereby enabling the electrode to be used in out-of-position welding. In still another embodiment, the zirconium compound content of the flux system is at least $\frac{2}{3}$ of the titanium compound content of the flux system. In one specific embodiment, the ratio of zirconia to titania in the flux system is about 1:1.5 to 10:1, and preferably about 1:1.5 to 3:1, and more preferably about 1:1.5 to 1.8:1. In still yet another embodiment, the silicon compound content plus zirconium compound content of the flux system is greater that the titanium compound content of the flux 10 system.

The flux system of the invention pertains to the discovery that increased concentrations of a zirconium compound in the flux system result in a quiet slag which can be easily removed after cooling of the weld bead. The effects of the zirconium compound are readily apparent when the zirconium compound content is at least $\frac{2}{3}$ of the titanium compound content in the flux system. The high zirconium compound content of the flux system is an improvement over Kotecki 5,120,931 since it allows for a reduction in the amount of silica and/or silicate in the flux system. Silica and/or silicates can cause the slag to adhere to the weld bead thereby making slag removal difficult. The addition of a bismuth compound does significantly reduce the slag removal problems, but some problems remain when using large quantities of silica and/or silicate. The higher zirconium compound content of the slag system of the present invention also helps to support the weld metal to allow for out-of-position welding. The higher silicon compound content of the flux system of the present invention is also an improvement over Kotecki 4,449,031. Kotecki 4,449,031 reduces the amount of silica to reduce the slag removal problems, but the reduction of silica can result in higher spattering occurrences. Silica and silicates reduce spattering during welding, especially when welding chromium containing metals. The increased amount of silicon compound in the flux system of the present invention results in significantly reduced occurrences of spattering. The inventors have discovered in the present invention a balance between the amount of silicon compound, titanium compound and zirconium compound which should be included in a flux system to reduce spatter during welding and to form a slag that can be easily removed from the weld bead.

In accordance with an aspect of the present invention, the zirconium compound content of the flux system constitutes at least about 10 weight percent of the slag system, preferably at least about 20 weight percent, and more preferably about 20–90 weight percent, and even more preferably about 30–60 weight percent of the slag system. In one embodiment, the zirconium compound is primarily zirconia. In another embodiment, the zirconium compound content is second only to the titanium compound content of the flux system. In still another embodiment, the zirconium compound content is the largest component of the flux system. In still yet another embodiment, the zirconium content of the flux system is at least the second largest oxide component of the flux system. In accordance with another aspect of the present invention, the silicon compound content of the flux system constitutes at least about 5 weight percent of the flux system, preferably over about 10 weight percent, and more preferably about 12–40 weight percent, and even more preferably about 15–35 weight percent of the flux system. In one embodiment, the silicon compound primarily includes silica and/or a silicate. In another embodiment, the weight percent ratio of zirconium compound to silicon compound is about 1:0.01 to 1:0.9, and preferably about 1:0.1 to 1:0.75, and more preferably about 1:0.12 to 1:0.7. In still another embodiment, the silicon compound is principally silica and is added to the flux system in the form of zircon sand, which contains about ⅔ zirconia and about ⅓ silica.

In accordance with still another aspect of the present invention, the titanium compound content of the flux system constitutes at least 5 weight percent, preferably at least about 15 weight percent, and more preferably about 20–50 weight percent, and even more preferably about 25–45 weight percent of the flux system. In one embodiment, the titanium compound is primarily titania. In another embodiment, the titanium compound content in the flux system is less than the zirconium compound content plus the silicon compound content in the flux system.

In accordance with yet another aspect of the present invention, a slag releasing agent is added to the flux system to increase the ease of removal of the slag from the weld bead. In one embodiment, the slag releasing agent includes bismuth and/or a bismuth compound. It has been found elemental bismuth and compounds which release elemental bismuth in the arc welding process will quiet the slag during solidification and allow for easy removal of the slag after solidification of the weld metal. The presence of bismuth has been found to improve the slag characteristics in an arc welding process, especially when welding high chromium bearing alloys, such as stainless steel. The use of a slag removal agent is more desirable when large amounts of a silicon compound are used in the flux system. In one embodiment, the slag removal agent includes bismuth metal, bismuth oxide, bismuth oxy-chloride, bismuth titanate, bismuth fluoride, and/or bismuth sulfide. In one embodiment, if a slag releasing agent is added to the flux system, it is preferably added in an amount of at least about 0.1 weight percent of the flux system, and more preferably about 0.2–4 weight percent of the flux system.

In accordance with another aspect of the present invention, the flux system is defined, as is normal practice, by the constituents forming the non-metallic slag creating system. Metal alloying constituents such as iron, nickel, chromium, etc. can be included with the flux system to form a weld metal having a composition that is the same or nearly the same as the composition of the workpiece being welded. It is believed that the high zirconium compound content of the flux system of the present invention affects the metal/slag interface to thereby reduce the difficulty in removing the slag from the weld bead. The zirconium compound in the flux system is also believed to help in reducing spattering during welding. In one embodiment, the zirconium content of the flux system is at least ⅔ of the titania content of the flux system, the zirconia content is greater than the silica and/or silicate content in the flux system, and the zirconia content plus the silica and/or silicate content is greater than the titania content in the flux system. By abiding by one or all of these criteria in the flux system, a superior weld bead is obtained which weld bead is form under reduced spatter conditions and the slag can be easily removed from the weld metal.

In accordance with still another aspect of the present invention, the flux system includes a melting control agent to assist in forming a slag which can support the molten weld metal in a variety of welding positions. The melting control agent helps to reduce the temperature of the slag to approach the temperature of the weld bead during welding. In one embodiment, the melting control agent includes compounds of aluminum, manganese and/or tin. In one specific embodiment, the melting control agent includes oxides of aluminum, manganese and/or tin. In another embodiment, the zirconium compound content is greater than the melting control agent content in the flux system. In still another embodiment, the content of the melting control agent in the flux system is about 0.0–15 weight percent, and preferably about 0.0–10 weight percent of the flux system.

In accordance with still yet another aspect of the present invention, the flux system includes an arc stabilizer. The use of an arc stabilizer facilitates in the reduction of spattering during the welding process. In one embodiment, the arc stabilizer includes a potassium compound and/or a sodium compound. In one specific embodiment, the arc stabilizer includes sodium oxide, sodium fluoride, sodium silico titanate, sodium aluminate, sodium aluminum silicate, sodium bismuthate, sodium fluosilicate, sodium manganate, sodium silicate, potassium oxide, potassium fluoride, potassium silico titanate, potassium aluminosilicate, potassium fluomanganate, potassium fluosilicate, potassium manganate and/or potassium silicate. In another embodiment, if an arc stabilizer is added to the flux system, it is added in an amount of at least about 0.1 weight percent of the flux system, and preferably about 0.2–4 weight percent of the flux system.

In accordance with yet another aspect of the present invention, the flux system includes a fluoride. Fluorides advantageously modify the slag properties to allow the flux system to be used in a wide variety of welding applications, to assist in the ease of slag removal after the slag cools, to reduce porosity in the weld bead, and/or to provide shielding to the weld bead from adverse effects of the atmosphere. In one embodiment, the fluoride includes bismuth fluoride, potassium silico fluoride, cryolite, potassium fluoride, sodium fluoride, barium fluoride and/or calcium fluoride. In one specific embodiment, fluoride is added to the flux system in an amount of about 0–25 weight percent of the flux system, preferably at least about 0.05 weight percent of the flux system, and more preferably about 0.1–25 weight percent of the flux system.

In accordance with still yet another aspect of the present invention, the electrode and/or flux system includes a bead wetting agent. The bead wetting agent assists in improving the flowability of the weld metal so as to form a superior quality weld bead. In one embodiment, the bead wetting agent includes a sulfur compound. The sulfur compound can be included in the electrode sheath and/or in the flux system. In one specific embodiment, if the bead wetting agent is included in the flux system, the bead wetting agent includes $MoS_2$. In another specific embodiment, the content of the bead wetting agent in the flux system is about 04 weight percent of the flux system, preferably at least about 0.05, and more preferably about 0.1–2 weight percent of the flux system.

In accordance with still yet another aspect of the present invention, the electrode includes a metal sheath and a flux system within the core of the metal sheath. In one embodiment, the metal sheath is carbon steel or stainless steel. If a stainless steel or chromium containing workpiece is to be welded, the metal sheath is preferably stainless steel. The flux system includes a substantial amount of a zirconium compound. An alloying system may be included with the flux system. The alloying system includes metal alloying agents present in an amount to form a weld bead having a composition that desired for the welding of a particular workpiece, such as Ni, Cr, Mo, Mn, Si, Nb, C, Fe, Al, V, W, Cu, Ti, B, Li and the like. When welding a stainless steel workpiece, the alloying system preferably includes nickel and/or chromium.

The primary object of the present invention is the provision of a flux for arc welding of chromium-bearing alloys, such as stainless steel, which flux produces a slag over the weld bead that can support the molten weld bead in a variety of welding positions.

Another object of the present invention is the provision of a flux, as defined above, which produces a slag over the weld bead that has a quiet slag behavior and is easy to remove from the weld bead. Slag behavior is quiet when it remains on the weld bead during solidification and cooling without explosions, popping and other slag spattering mechanical phenomena.

Yet another object of the present invention is the provision of a flux, as defined above, which includes a substantial amount of a zirconium compound to reduce slag spattering and improve the ease of slag removal from the weld bead.

Another object of the present invention is the provision of a flux, as defined above, which includes a zirconium compound and a titanium compound and the zirconium compound content is at least ⅔ the titanium compound content.

A further object of the present invention is the provision of a flux, as defined above, which includes a zirconium compound and a silicon compound and the zirconium compound content is greater than the silicon content.

Still another object of the present invention is the provision of a flux, as defined above, which includes a zirconium compound, a titanium compound and a silicon compound and the zirconium compound content plus the silicon compound content is greater than the titanium compound content.

Still yet another object of the present invention is the provision of a flux, as defined above, which electrode and flux employ certain bismuth containing compounds or elemental bismuth itself so that bismuth is available at the slag/metal interface to cause a quiet slag behavior during cooling and easy slag removal.

Yet another object of the present invention is the provision of a flux which can be used in submerged arc welding, coated on a consumable electrode and/or placed in the core of an electrode.

Still another object of the present invention is the provision of an electrode and/or a flux including a wetting agent to achieve the desired flowability of the weld metal.

Yet another object of the present invention is the provision of a flux, as defined above, which includes an arc stabilizer to facilitates in the reduction of spattering during the welding process.

Still yet another object of the present invention is the provision of a flux, as defined above, which includes melting control agent to assist in forming a slag which can support the molten weld metal in a variety of welding positions.

Another object of the present invention is the provision of a flux, as defined above, which includes fluorides to advantageously modify the slag properties, to assist in the ease of slag removal after the slag cools, to reduce porosity in the weld bead, and/or to provide shielding to the weld bead from adverse effects of the atmosphere.

These and other objects and advantages will become apparent to those skilled in the art upon reading the following description.

DESCRIPTION OF THE PREFERRED EMBODIMENTS

In evaluating slag behavior in arc welding installations, the term "quiet" indicates that the slag may have some crackling noises during cooling and small pieces may even depart from the weld bead by a few inches; however, there is no major projection of the slag from the weld bead during cooling. Thus, the risk of facial injury by the welder is non existent. The term "popping" indicates that during cooling of the weld bead, hot pieces of slag depart from the weld bead surface with a distinct popping noise and with enough velocity to reach the facial height and inflict burns on a welder who has raised his hood and is otherwise unprotected. The more radical classification of slag behavior is "explosive". In this classification, during cooling, hot pieces of slag depart from the weld bead surface with a distinct popping noise and with enough velocity to be hazardous not only to the welder himself but also to anyone within 20–25 feet of the welder. The slag behavior created by the present invention is "quiet" or mild "popping." Turning now to the question of removal characteristics of the slag, the first classification is "easy". Easy slag removal indicates that the slag can be completely removed from the weld bead with only slight tapping and/or brushing. The next term for removal characteristics is "moderate" which indicates that the slag can be completely removed from the weld bead only after relatively hard hitting with a heavy hammer or other instrument. The next classification for removal of the slag is "difficult". A difficult slag removal situation indicates that slag can be completely removed from the weld bead only after numerous hard blows with a heavy hammer, such as a slag hammer. Pieces of the slag tend to cling to the weld bead even after this action and must be individually impacted by the hammer for removal. The last classification is "very difficult". When slag removal is very difficult, the slag does not remove completely from the weld bead even after numerous slag hammer blows and other physical intervention. In this situation, a needle gun may be necessary to clean the surface of the weld bead. Such difficulty of slag removal is not unusual when welding a chromium-bearing alloy, such as stainless steel. Chromium-bearing alloy is defined as an alloy that includes at least about 1 weight percent chromium in the weld metal deposited. In stainless steel, the chromium content is generally above 10% by weight of the metal deposited (e.g. 410 stainless). The slag behavior created by the present invention is easy to moderate slag removal.

The general formulation of the flux system of the present invention is as follows:

|  | % Flux System |
|---|---|
| Zirconia | 10–90 |
| Titania | 5–<50 |
| Silica | 5–40 |
| Melting control agent | 0–15 |
| Fluoride | 0–25 |
| Arc stabilizer | 0–10 |
| Slag removal agent | 0–4 |
| Bead wetting agent | 0–4 |

The weight percent ratio of zirconia to titania is at least about 1:1.5. The silica content plus zirconia content is greater than the titania content.

A specific formulation range of the flux system is as follows:

|  | % Flux System |
|---|---|
| Zirconia | 20–70 |
| Titania | 20–40 |
| Silica | >10–35 |
| Melting control agent | 0–10 |
| Fluoride | 0–15 |
| Arc stabilizer | 0–4 |
| Slag removal agent | 0–2 |
| Bead wetting agent | 0–2 |

The weight percent ratio of zirconia to titania is about 1:1.5 to 3:1. The silica content plus the zirconia content is greater than the titania content. The zirconia content is greater than the silica content.

In a more specific formulation, range of the flux system is as follows:

|  | % Flux System |
|---|---|
| Zirconia | 30–60 |
| Titania | 25–40 |
| Silica | 15–35 |
| Melting control agent | 0–10 |
| Fluoride | 0–15 |
| Arc stabilizer | 0.1–1 |
| Slag removal agent | 0.1–1 |
| Bead wetting agent | 0.05–1 |

The weight percent ratio of zirconia to titania is about 1:1.5 to 3:1. The silica content plus zirconia content is greater than the titania content. The weight percent ratio of zirconia to silica is about 1:0.12 to 1:0.7.

The flux system is incorporated into the core of a stainless steel electrode for the welding of 308, 309L and 316L stainless steel. The flux system makes up about 20–100 weight percent of the electrode core and preferably about 35–60 weight percent of the electrode core. The other constituents of the electrode core include iron, alloying agents and/or deoxidizers. The flux system makes up about 8–35 weight percent of the total electrode. As can be appreciated, the flux system can be coated onto an electrode or used in submerged arc welding.

The principal components of the flux system are silica, titania and zirconia. The zirconia constitutes over 10 weight percent of the flux system. The zirconia content is also at least about ⅔ of the titania content of the flux system, thus the ratio of zirconia to titania is at least about 1:1.5.

The zirconia content plus the silica content of the flux system is maintained to be greater than the titania content of the flux system. The zirconia content is also greater than the silica content in the flux system. By maintaining these three criteria of the flux system, a quality weld bead is form without excessive spattering and the slag can be relatively easily removed from the weld bead.

The bismuth slag releasing agent, if added, is incorporated in at least about 0.05% by weight of the flux system. A fluoride, if added, is incorporated in the flux system in a range of 0.05–15% by weight of the flux system.

Five specific examples of the flux system are as follows:

| Example A (% flux) | |
|---|---|
| Zirconia | 51.5 |
| Titania | 30.3 |
| Silica | 6.5 |
| Potassium silica titanate | 10.2 |
| $MoS_2$ | 0.7 |
| $BiF_3$ | 0.9 |
| Example B (% flux) | |
| Zirconia | 34.8 |
| Titania | 39.3 |
| Silica | 23.2 |
| Potassium oxide | 1.2 |
| $BiF_3$ | 0.9 |
| $MoS_2$ | 0.7 |
| Example C (% flux) | |
| Zirconia | 42.2 |
| Titania | 39.0 |
| Silica | 16.4 |
| Sodium oxide | 1.1 |
| $BiO_2$ | 0.7 |
| $MoS_2$ | 0.6 |
| Example D (% flux) | |
| Zirconia | 62.3 |
| Titania | 18.8 |
| Silica | 13.4 |
| Sodium fluoride | 1.2 |
| $Al_2O_3$ | 3.5 |
| $BiF_3$ | 0.8 |
| Example E (% flux) | |
| Zirconia | 34.3 |
| Titania | 34.0 |
| Silica | 15.1 |
| Potassium fluoride | 0.9 |
| Calcium fluoride | 11.6 |
| $Al_2O_3$ | 2.6 |
| $BiO_2$ | 0.9 |
| $MoS_2$ | 0.6 |

The shielding gas used for the examples can include $CO_2$ or 75–80% Ar-20–25% $CO_2$. The flux systems resulted in easy to moderate slag removal, quiet to slight popping slag behavior with excellent penetration during welding, and a flat well-shaped bead in a variety of welding positions.

The invention has been described with reference to a preferred embodiment and alternatives thereof. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

Having thus defined the invention, the following is claimed:

1. An electrode for use in arc welding of a steel workpiece with a metal sheath having at least about 1 percent chromium by weight of said electrode, said electrode including a flux comprising a zirconium compound containing system for forming slag on the surface of the deposited weld metal, said zirconium compound containing flux system comprising a silicon compound, a titanium compound, a zirconium compound and a melting control agent, the weight ratio of said zirconium compound to said titanium compound is about 1:1.5 to about 10:1, the weight ratio of said zirconium compound to said silicon compound is about 1:0.01 to about 1:0.9, the silicon compound content plus the zirconium compound content plus the melting control agent content is greater than the titanium compound content, said silicon compound content is about 5–40 weight percent of said flux, said titanium compound content is about 5 to less than about 50 weight percent of said flux, said zirconium compound content is about 10–90 weight percent of said flux, said melting control agent is about 0–15 weight percent of said flux, said zirconium compound including zirconia, said silicon compound including silica, said titanium compound including titania, said melting control agent including an oxide selected from the group consisting of an oxide of aluminum, an oxide of manganese, an oxide of tin, and mixtures thereof.

2. An electrode as defined in claim 1, wherein said weight ratio of zirconium compound to said titanium compound is about 1:1.5 to about 3:1.

3. An electrode as defined in claim 2, wherein said weight ratio of zirconium compound to said titanium compound is about 1:1.5 to about 1.8:1.

4. An electrode as defined in claim 1, wherein said weight ratio of zirconium compound to said silicon compound is about 1:0.1 to about 1:0.75.

5. An electrode as defined in claim 2, wherein said weight ratio of zirconium compound to said silicon compound is about 1:0.1 to about 1:0.75.

6. An electrode as defined in claim 4, wherein said weight ratio of zirconium compound to said silicon compound is about 1:0.12 to about 1:0.7.

7. An electrode as defined in claim 1, wherein said zirconium compound content is greater than said titanium compound content.

8. An electrode as defined in claim 5, wherein said zirconium compound content is greater than said titanium compound content.

9. An electrode as defined in claim 1, wherein said zirconium compound content is about 20–70 weight percent of said flux.

10. An electrode as defined in claim 8, wherein said zirconium compound content is about 20–70 weight percent of said flux.

11. An electrode as defined in claim 9, wherein said zirconium compound content is about 30–60 weight percent of said flux.

12. An electrode as defined in claim 1, wherein said silicon compound content is about 10–40 weight percent of said flux.

13. An electrode as defined in claim 10, wherein said silicon compound content is about 10–40 weight percent of said flux.

14. An electrode as defined in claim 12, wherein said silicon compound content is about 12–40 weight percent of said flux.

15. An electrode as defined in claim 14, wherein said silicon compound content is about 15–35 weight percent of said flux.

16. An electrode as defined in claim 1, wherein said titanium compound content is about 20–45 weight percent of said flux.

17. An electrode as defined in claim 13, wherein said titanium compound content is about 20–45 weight percent of said flux.

18. An electrode as defined in claim 16, wherein said titanium compound content is about 25–40 weight percent of said flux.

19. An electrode as defined in claim 1, including a slag removal agent, said slag removal agent including a bismuth containing slag agent selected from the group consisting of elemental bismuth, bismuth oxide, bismuth fluoride, bismuth sulfide, bismuth titanate, bismuth oxy carbonate, bismuth oxy-chloride and mixtures thereof.

20. An electrode as defined in claim 17, including a slag removal agent, said slag removal agent including a bismuth containing slag agent selected from the group consisting of elemental bismuth, bismuth oxide, bismuth fluoride, bismuth sulfide, bismuth titanate, bismuth oxy carbonate, bismuth oxy-chloride and mixtures thereof.

21. An electrode as defined in claim 19, wherein said slag removal agent is about 0.1–4 weight percent of said flux.

22. An electrode as defined in claim 1, wherein said flux includes an arc stabilizer, said arc stabilizer including a compound selected from the group consisting of a potassium compound, a sodium compound and mixtures thereof.

23. An electrode as defined in claim 20, wherein said flux includes an arc stabilizer, said arc stabilizer including a compound selected from the group consisting of a potassium compound, a sodium compound and mixtures thereof.

24. An electrode as defined in claim 22, wherein said arc stabilizer is about 0.1–4 weight percent of said flux.

25. An electrode as defined in claim 1, wherein said flux includes a fluoride, said fluoride including a compound selected from the group consisting of bismuth fluoride, potassium silico fluoride, cryolite, potassium fluoride, sodium fluoride, barium fluoride, calcium fluoride, and mixtures thereof.

26. An electrode as defined in claim 25, wherein said fluoride is about 0.05–25 weight percent of said flux.

27. An electrode as defined in claim 1, including a bead wetting agent, said bead wetting agent including sulfur, a sulfur compound and mixtures thereof.

28. An electrode as defined in claim 23, including a bead wetting agent, said bead wetting agent including sulfur, a sulfur compound and mixtures thereof.

29. An electrode as defined in claim 28, wherein said flux includes a fluoride, said fluoride including a compound selected from the group consisting of bismuth fluoride, potassium silico fluoride, cryolite, potassium fluoride, sodium fluoride, barium fluoride, calcium fluoride, and mixtures thereof.

30. An electrode as defined in claim 27, wherein said bead wetting agent is about 0.05–2 weight percent of said flux.

31. An electrode as defined in claim 1, wherein said flux comprises by weight percent of said flux:

| | |
|---|---|
| Zirconia | 10–90% |
| Titania | 5 to less than about 50% |
| Silica | greater than about 5 to 40% |
| Melting Control Agent | 0–15% |
| Fluoride | 0–25% |
| Arc stabilizer | 0–10% |

-continued

| | |
|---|---|
| Slag removal agent | 0–4% |
| Bead wetting agent | 0–4% |

32. An electrode as defined in claim 31, wherein said flux comprises by weight percent of said flux:

| | |
|---|---|
| Zirconia | 20–70 |
| Titania | 20–40 |
| Silica | greater than about 10 to 35 |
| Melting control agent | 0–10 |
| Fluoride | 0–15 |
| Arc stabilizer | 0–4 |
| Slag removal agent | 0–2 |
| Bead wetting agent | 0–2 | the weight ratio of zirconia to titania is about 1:1.5 to 3:1, and the silica content plus the zirconia content is greater than the titania content.

33. An electrode as defined in claim 31, wherein said flux comprises by weight percent of said flux:

| | |
|---|---|
| Zirconia | 20–70 |
| Titania | 20–40 |
| Silica | greater than about 10 to 35 |
| Melting control agent | 0–10 |
| Fluoride | 0–15 |
| Arc stabilizer | 0–4 |
| Slag removal agent | 0–2 |
| Bead wetting agent | 0–2 | the weight ratio of zirconia to titania is about 1:1.5 to 3:1, and the silica content plus the zirconia content is greater than the titania content.

34. An electrode as defined in claim 32, wherein said flux comprises by weight percent of said flux:

| | |
|---|---|
| Zirconia | 30–65% |
| Titania | 15–40% |
| Silica | 12–35% |
| Melting Control Agent | 0–10% |
| Calcium Fluoride | 0–15% |
| Arc stabilizer | 0.1–1.5% |
| Slag removal agent | 0.1–1% |
| Bead wetting agent | 0.05–1% |

35. An electrode as defined in claim 32, wherein said flux comprises by weight percent of said flux:

| | |
|---|---|
| Zirconia | 30–65% |
| Titania | 15–40% |
| Silica | 12–35% |
| Melting Control Agent | 0–10% |
| Calcium Fluoride | 0–15% |
| Arc stabilizer | 0.1–1.5% |
| Slag removal agent | 0.1–1% |
| Bead wetting agent | 0.05–1% |

36. An electrode as defined in claim 34, wherein said flux comprises by weight percent of said flux:

| | |
|---|---|
| Zirconia | 30–65 |
| Titania | 18–40 |
| Silica | 12–35 |
| Oxide of Al, Mn and/or Sn | 0–10 |
| Fluoride | 0–15 |
| Potassium and/or Sodium compound | 0.1–1.2 |
| Bismuth and/or Bismuth compound | 0.1–1 |
| Sulfur containing bead wetting agent | 1.05–1. |

37. An electrode as defined in claim 34, wherein said flux comprises by weight percent of said flux:

| | |
|---|---|
| Zirconia | 30–65 |
| Titania | 18–40 |
| Silica | 12–35 |
| Oxide of Al, Mn and/or Sn | 0–10 |
| Fluoride | 0–15 |
| Potassium and/or Sodium compound | 0.1–1.2 |
| Bismuth and/or Bismuth compound | 0.1–1 |
| Sulfur containing bead wetting agent | 0.05–1. |

38. An electrode as defined in claim 36, wherein said flux comprises by weight percent of said flux:

| | |
|---|---|
| Zirconia | 30–60 |
| Titania | 25–40 |
| Silica | 15–35 |
| Melting control agent | 0–10 |
| Fluoride | 0–15 |
| Arc stabilizer | 0.1–1.2 |
| Slag removal agent | 0.1–1 |
| Bead wetting agent | 0.05–1 | the weight ratio of zirconia to silica is about 1:0.12 to 1:0.7.

39. An electrode as defined in claim 36, wherein said flux comprises by weight percent of said flux:

| | |
|---|---|
| Zirconia | 30–60 |
| Titania | 25–40 |
| Silica | 15–35 |
| Melting control agent | 0–10 |
| Fluoride | 0–15 |
| Arc stabilizer | 0.1–1.2 |
| Slag removal agent | 0.1–1 |
| Bead wetting agent | 0.05–1 | the weight ratio of zirconia to silica is about 1:0.12 to 1:0.7.

40. An electrode as defined in claim 38, wherein said flux comprises by weight percent of said flux:

| | |
|---|---|
| Zirconia | 30–40 |
| Titania | 25–40 |
| Silica | 15–25 |
| Oxide of Al, Mn and/or Sn | 0–10 |

| | |
|---|---|
| Fluoride | 0–10 |
| Potassium and/or Sodium compound | 0.5–1.2 |
| Bismuth and/or Bismuth compound | 0.5–1 |
| Sulfur containing bead wetting agent | 0.2–0.8. |

41. An electrode as defined in claim 38, wherein said flux comprises by weight percent of said flux:

| | |
|---|---|
| Zirconia | 30–40 |
| Titania | 25–40 |
| Silica | 15–25 |
| Oxide of Al, Mn and/or Sn | 0–10 |
| Fluoride | 0–10 |
| Potassium and/or Sodium compound | 0.5–1.2 |
| Bismuth and/or Bismuth compound | 0.5–1 |
| Sulfur containing bead wetting agent | 0.2–0.8. |

42. An electrode as defined in claim 31, wherein said flux comprises by weight percent of said flux:

| | |
|---|---|
| Zirconia | 51.5 |
| Titania | 30.3 |
| Silica | 6.5 |
| Potassium silica titanate | 10.2 |
| $MoS_2$ | 0.7 |
| $BiF_3$ | 0.9. |

43. An electrode as defined in claim 31, wherein said flux comprises by weight percent of said flux:

| | |
|---|---|
| Zirconia | 34.8 |
| Titania | 39.3 |
| Silica | 23.2 |
| Potassium oxide | 1.2 |
| $BiF_3$ | 0.9 |
| $MoS_2$ | 0.7. |

44. An electrode as defined in claim 31, wherein said flux comprises by weight percent of said flux:

| | |
|---|---|
| Zirconia | 42.2 |
| Titania | 39.0 |
| Silica | 16.4 |
| Sodium oxide | 1.1 |
| $BiO_2$ | 0.7 |
| $MoS_2$ | 0.6. |

45. An electrode as defined in claim 31, wherein said flux comprises by weight percent of said flux:

| | |
|---|---|
| Zirconia | 62.3 |
| Titania | 18.8 |
| Silica | 13.4 |
| Sodium fluoride | 1.2 |
| $Al_2O_3$ | 3.5 |
| $BiF_3$ | 0.8. |

46. An electrode as defined in claim 31, wherein said flux comprises by weight percent of said flux:

| | |
|---|---|
| Zirconia | 34.3 |
| Titania | 34.0 |
| Silica | 15.1 |
| Potassium fluoride | 0.9 |
| Calcium fluoride | 11.6 |
| $Al_2O_3$ | 2.6 |
| $BiO_2$ | 0.9 |
| $MoS_2$ | 0.6. |

\* \* \* \* \*